Sept. 6, 1966    F. DEKKER    3,270,933
AIR-CUSHIONED TAPE GUIDE
Filed Dec. 20, 1963    2 Sheets-Sheet 1

INVENTOR:
Frank Dekker

Attorneys

Sept. 6, 1966   F. DEKKER   3,270,933
AIR-CUSHIONED TAPE GUIDE
Filed Dec. 20, 1963   2 Sheets-Sheet 2

INVENTOR:
Frank Dekker

United States Patent Office 3,270,933
Patented Sept. 6, 1966

3,270,933
AIR-CUSHIONED TAPE GUIDE
Frank Dekker, Inglewood, Calif., assignor to Minnesota Mining and Manufacturing Company, St. Paul, Minn., a corporation of Delaware
Filed Dec. 20, 1963, Ser. No. 332,014
13 Claims. (Cl. 226—97)

This invention relates to a tape-transport mechanism wherein a portion of the tape is driven under tension by a differential capstan and is looped around a reversing capstan or idler with transducers adjacent the two legs of the loop for recording and reproducing signals. The invention is specifically directed to the problem of controlling the travel of the tensioned tape loop with an exceedingly high degree of accuracy.

In a tape-transport mechanism of the type to which the invention pertains, the tape is a multiple-channel tape with a pair of transducers in the form of writing heads spaced along one leg of the tape loop to record signals and a second pair of transducers in the form of reading heads spaced along the other leg to reproduce signals. One transducer of each pair tracks the odd-numbered channels on the tape and the other transducer of the pair tracks the even-numbered channels. The tape is driven selectively at speeds of 7½ inches, 15 inches, 30 inches, 60 inches, 120 inches, and 180 inches per second, and for acceptable accuracy with the plurality of transducers, the tape must neither lead nor lag by as much as 7½ microinches in comparison with an ideal, absolutely constant speed. The fact that this maximum range of 15 microinches of displacement is exceedingly small may be appreciated when it is considered that the range is equal to the wave length of green light and that the top speed of 180 inches per second is 8,000,000 times the permissible deviation. The deviation from constant velocity is conveniently detected as a time displacement in microseconds. The linear deviation or physical displacement in microinches may be derived from the time displacement and, of course, depends on the selected speed of travel of the tape.

A number of steps have been taken towards achieving close control over the tensioned loop of tape. One important advance has been the provision of an exceedingly sensitive servomechanism, the servomechanism having a bandwidth extending to 4,000 c.p.s. for quick response. To make such a servomechanism operable, a printed circuit motor having a high ratio of torque to inertia is used in conjunction with a low-inertia drive capstan assembly. Another step towards the required close control has been taken by incorporating damping means in both the drive capstan and the reversing capstan, each damping means comprising a confined, independently rotatable, concentric damping body surrounded by a liquid film.

Tests have revealed that, contrary to expectations, these two steps do not result in close accurate control of the speed of the tape, even though the servosystem is sufficiently sensitive to keep the deviations within the required displacement range of 15 microinches. A suitable test procedure is to compare the signals from the two reproducing reading heads to obtain a first error measurement, which is the resultant of both time displacement and skew or twist in the tape. Then the signals received by one of the transducers from different channels are compared to isolate the skew error, and this skew error is subtracted from the first measurement to isolate the time displacement that occurs between the two transducer heads.

When a time displacement is found to exist between the two reading heads, a time displacement must also exist between the drive capstan and the nearest reading head and, of course, a much larger time displacement exists between the drive capstan and the reading head that is furthest from the drive capstan.

It has been discovered that the varying time displacement between the two spaced reproducing transducers arises because of the compliance of the tape together with the inertia of the reversing capstan. The two resilient legs of the tensioned tape loop behave like two tensioned springs and the inertia of the reversing capstan functions as a weight floatingly suspended between the two springs. When the drive capstan is accelerated by a signal from the servo system, the correction in the velocity is transmitted to the reversing capstan by the spring action of the resilient tape and, of course, the inertia of the reversing capstan resists the correction. When the reversing capstan does respond to the correction signal, moreover, it tends to overcorrect because of its inertia. With this discovery, it became apparent that since the compliance or resiliency of the tape is unavoidable, the desired close control of the tape speed may be obtained only by eliminating the inertia of the reversing capstan.

The invention meets this problem by providing an air cushion to maintain the traveling tape out of contact with the reversing capstan, thereby completely isolating the reversing capstan from the tape. Since the reversing capstan is not mechanically coupled with the tape, rotation is not necessary and the reversing capstan may be simply a fixed perforate hollow cylinder supplied with compressed air. The cylinder may be rotatable, however, if desired.

Attempts have been made to develop a reversing capstan of this type by simply drilling holes in a closed metal cylinder or tube. But these attempts have failed, for reasons that will be explained. It was finally discovered that a stable operative air cushion of uniform character throughout its whole area can be provided by using a porous cylindrical member such as a metal tube made of sintered powdered metal or a porous ceramic tube, the requirement being closely spaced, exceedingly small tortuous passages through the wall of the tube.

The features and advantages of the invention may be understood from the following detailed description and the accompanying drawings.

In the drawings, which are to be regarded as merely illustrative:

FIG. 5 indicating how approximately half the circumference of the reversing capstan may be masked by suitable material such as solder to make the half of the reversing capstan nonporous;

Figure 1:
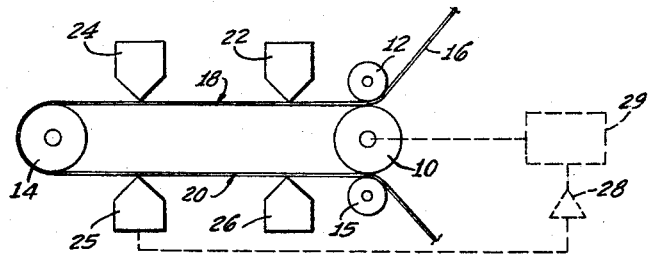
FIG. 1 is a diagrammatic plan view of a tape transport mechanism of the character to which the invention relates, the tape transport mechanism forming the traveling tape into a tensioned loop having two legs.

FIG. 1 shows schematically a conventional tape transport arrangement for driving a tape with a portion of the tape formed into a tensioned loop. The tape as it is unwound from a supply reel (not shown) passes between a drive capstan 10 and a first nip-roller 12 which cooperate to drive the tape at a given speed. The tape passes around a rotary reversing capstan 14 and then is engaged by the drive capstan 10 and second nip-roller 15, which cooperate to drive the tape at a speed somewhat higher than the given speed. Thus, the arrangement forms the traveling tape 16 into a tensioned loop having an outgoing leg 18 extending from the drive capstan to the reversing capstan and an ingoing leg 20 extending from the reversing capstan to the drive capstan. The tape is then suitably guided to a take-up reel (not shown).

As taught, for example, in the Mullin Patent 2,913,192, the drive capstan 10 has different circumferential drive surfaces of different diameters, and the differential speed is accomplished by the first nip-roller 12 pressing the tape against a circumferential drive surface of a given diameter while the second nip-roller 15 presses the tape against a circumferential drive capstan surface of greater diameter.

In the particular arrangement shown in FIG. 1, a pair of transducers 22 and 24 contact the outgoing leg 18 of the tape, and a second pair of spaced transducers 25 and 26 contact the ingoing leg 20. In a multiple-channel system, the two transducers 22 and 24 may be used for recording, with the transducer 22 recording the odd-numbered channels and the transducer 24 recording the even-numbered channels. In such an arrangement, the transducers 25 and 26 are reading heads, in which the reading head 25 reads the odd-numbered channels and the reading head 26 reads the even-numbered channels.

For the purpose of driving the tape accurately at a constant speed under close control in the operation of reproducing signals, the speed of the tape is detected by one of the reading heads 25 and 26, and the signals are fed to a closed-loop servomechanism. As indicated diagrammatically in dotted lines, the servoloop may include the reading head 25, a power amplifier 28, and a power means 29 that is responsive to the amplifier and actuates the drive capstan 10.

As heretofore stated, it was discovered that the failure of the described arrangement to achieve the desired degree of close control arises from the fact that the two legs 18 and 20 of the tensioned tape function as springs, and the inertia of the rotary return capstan 14 functions in the manner of a weight suspended between the two springs. This phenomenon is illustrated by the analogous arrangement shown in FIG. 2, where a coil spring 18a corresponding to the leg 18 of the tape loop is anchored between a support 30 and a floating weight 14a. A second coil spring 20a corresponding to the leg 20 of the tape loop interconnects a second support 32 and the floating weight 14a, the floating weight representing the inertia of the rotary reversing capstan 14.

Figure 2:
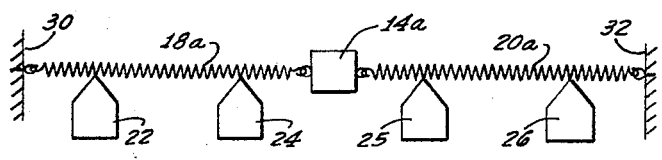
FIG. 2 is a diagram showing how the arrangement shown in FIG. 1 is equivalent to a weight suspended between two tensioned springs, the weight representing the inertia of the reversing capstan and the two tensioned springs representing the resilience of the two legs of the loop of the tensioned tape.

A change in the speed of rotation of the drive capstan 10 in response to a correction signal developed in the servoloop is equivalent, in effect, to shifting the two supports 30 and 32 simultaneously slightly to the right or to the left as viewed in FIG. 2. It is apparent that such a sudden lateral shift of the two supports 30 and 32, even though very slight, causes the two springs and the floating weight to act in an unstable manner, the floating weight 14a oscillating right and left. The unstable behavior results from the fact that the inertia of the floating weight 14a opposes the correction force and delays the responsive shift of the floating weight. When the floating weight does respond by shifting laterally the inertia opposes termination of the response and thus causes the floating weight to "overshoot" the corrective force. It may be readily appreciated that in FIG. 2 the degree of instability, i.e., the magnitude of oscillation progressively increases from the anchored ends of the two springs 18a and 20a towards the central floating weight 14a. Thus, a correction force causes greater oscillation of the spring 20a in the region of the reading head 25 than in the region of the nearer reading head 26. The instability of the spring 20a in the region of the nearer reading head 26 may be of sufficiently small magnitude for satisfactory control when the nearer reading head 26 serves as the pickup for the servoloop; but even though such a servoloop may function satisfactorily, the greater instability in the region of the more remote reading head 25 may be intolerable. If an attempt is made to control the system by using the more remote reading head 25 for the servo pickup, the result is entirely unsatsifactory because of the excessive oscillation of the spring 20a in the region of the more remote reading head, the servoloop attempting to accelerate and decelerate the travel of the tape in accord with the excessive oscillations.

Figure 3:
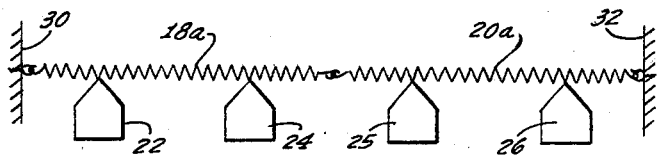
FIG. 3 is a diagram similar to FIG. 2 with the weight eliminated and with the two tensioned springs functioning as a single uninterrupted tensioned spring.

FIG. 3 shows the same analogous arrangement with the floating weight 14a eliminated to illustrate the effect of removing the inertia of the rotary return capstan 14. In FIG. 3, the two springs 18a and 20a are interconnected to function as a single spring stretched between the two supports 30 and 32. With the central weight 14a omitted, the interconnected springs 18a and 20a respond in a stable manner to any correction force that in effect causes simultaneous shift either rightward or leftward of the two supports 30 and 32.

The test as to whether or not eliminating the inertia of the reversing capstan results in stabilization of the traveling tape is made simply by using the more remote reading head 25 as the pickup for the servoloop. If the whole system then operates in a satisfactory manner, it is because the tape in the region of the more remote reading head responds to control forces in a prompt and stable manner.

The present invention meets this test. With the reversing capstan isolating the reversing capstan from the tape by means of an interposed air cushion and thus eliminating the inertia of the reversing capstan, the servo-controlled tensioned tape loop travels in a stable manner when the reading head 25 that is furtherest removed from the drive capstan is employed for the servo-pickup.

Figure 4:
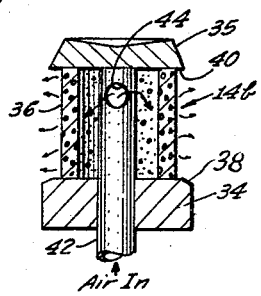
FIG. 4 is a longitudinal cross-sectional view of a reversing capstan constructed as taught by the invention.
Figure 6:
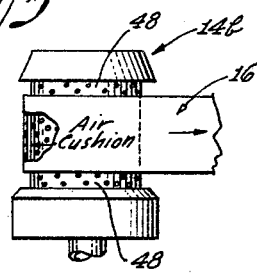
FIG. 6 is a side elevational view of the reversing capstan with a tape looped around the reversing capstan, the porous portion of the reversing capstan exceeding the width of the traveling tape.

The preferred embodiment of the new reversing capstan is generally designated 14b in FIGS. 4 and 6 and is a hollow body having a bottom wall or base 34 and a top or end wall 35 with an intermediate cylindrical wall 36 interconnecting the bottom and top wall. The bottom wall forms a flange with a sloping shoulder 38 and the top wall 35 forms a flange with a radial shoulder 40. The cylindrical wall 36 is a porous wall which may be made of powdered metal or any other suitable porous material such as a ceramic material. The cylindrical wall 36 is joined to the bottom wall 34 and the top wall 35 in a fluid tight manner. The interior of the reversing capstan is supplied with compressed air from a suitable source by means of an axial tube 42 having one or more discharge ports 44 inside the capstan.

The utility of a porous capstan wall in which the material is of a fine particle size may be appreciated by considering a typical experiment among the early unsuccessful experiments that were attempted for the purpose of creating around the periphery of the reversing capstan a cushion of air of sufficient effectiveness to keep the tape from touching the capstan surface at any point whatsoever.

Figure 7:
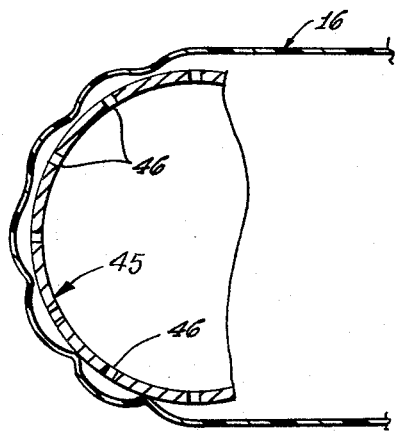
FIG. 7 is an enlarged fragmentary sectional view showing how the tape behaves when the reversing capstan takes the form of a solid metal cylinder with holes drilled therein.

FIG. 7 shows diagrammatically the result of employing a fixed metal tube for the purpose of the invention, the tube being ½ inch long and the thickness of the tube wall being 1/16 inch. 48 holes 46 in a distributed pattern were drilled over a circumferential extent of 180°, the diameter of each hole being .013 inch. As indicated in FIG. 7, the tape 16 bows outward from the fixed metal tube 45 in the region directly opposite each of the small bores 46. A dynamic situation prevails in which the tape flutters and undulates and is substantially constantly in frictional contact with the metal tube at spaced points, the spaced points changing in a random manner. This unstable state of the tape not only creates friction that mechanically couples the tape with the fixed tube but also results in erratic functioning in the recording and reproducing of signals.

Attempts were made to achieve success using even smaller holes, but it became apparent that successful operation would require a great number of smaller holes at closer spacing. It is possible with special techniques to drill holes of a diameter of .0001 inch and holes as small as .0005 have been bored in metal. .0001 inch may be taken as a practical limit and when it is considered how many holes are needed to avoid the undulating tape configuration shown in FIG. 7 it becomes impractical to attempt commercial production of metal tubes of the required character.

In all of the attempts to provide an operative reversing capstan by drilling holes in a tubular metal wall and supplying compressed air to the interior of the tubular structure, it was exceedingly difficult to avoid a tendency for the tape to shift laterally. The tendency was caused by nonuniformity in the air cushion, more air per unit area passing through the tubular wall in one region than in another region with a consequent tendency for the tape to shift towards the region of lessor air supply.

The first experiment that was successful for producing an effective and stable air cushion between a traveling tape and the periphery of a fixed reversing capstan was carried out by employing a tubular lubricant-impregnated bearing sold under the trademark "Oilite." Such a bearing is made of porous powdered metal with the interstices filled with lubricant. For the purpose of the experiment, the lubricant was removed by solvent to make the tubular wall permeable to air. With the reversing capstan constructed in the general manner indicated in FIG. 4, an air pressure inside the capstan of 3 p.s.i. was maintained and was found to form an effective and satisfactory air cushion of uniform character throughout its area. It was found that operating the reversing capstan at a pressure of 6 p.s.i. provided a satisfactory safety margin for continuous operation under varied operating conditions.

The next step was to try porous cylindrical filters made of sintered powdered stainless steel metal of the type available from the Asco Sintering Corporation, Los Angeles, California, the filters being sold under the trademark "Asco Crespor Stainless Steel Filters." Filters of this type suitable for the purpose of the present invention may be on the order of ¾ of an inch in diameter with a wall thickness, for example, of 1/16 to 1/8 inch.

Figure 10:
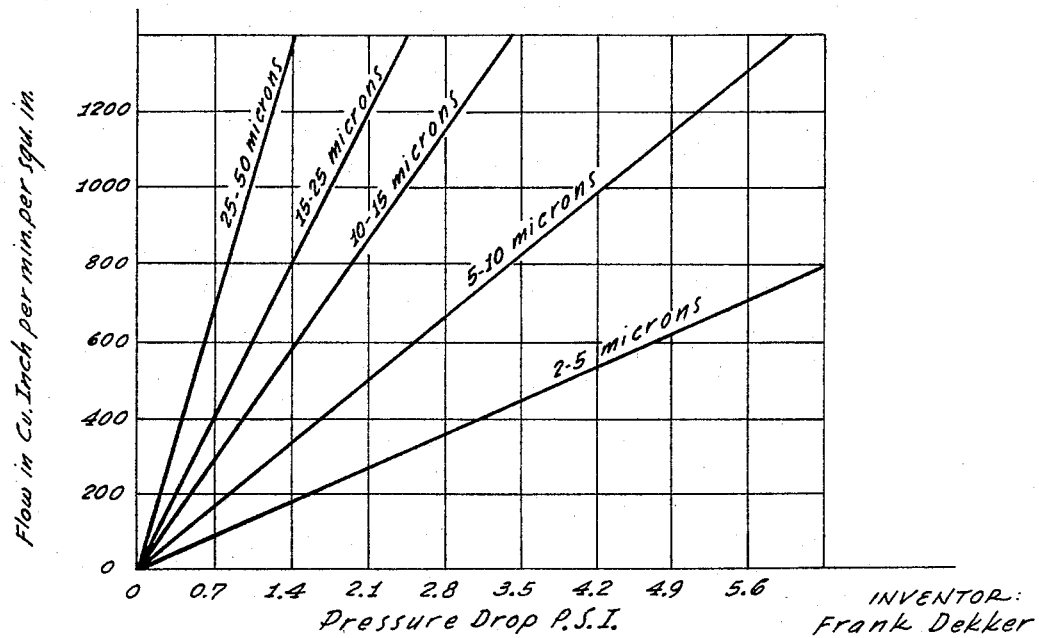
FIG. 10 is a graph in which the pressure drop is plotted against the rate of air flow for sintered powdered metal return capstans of different degrees of particle size.

FIG. 10 is a graph showing the rates of airflow through one square inch of such a porous wall at various pressure differentials. Filters of the three particle sizes 2–5 microns, 5–10 microns and 10–15 microns have been found to perform successfully for the purpose of the invention and this overall range of 2 to 25 micron particle size is preferred. Larger particle sizes indicated in FIG. 10 may be employed, but it is apparent that the amount of airflow with the larger particle sizes is relatively high when it is considered that a reversing capstan may be in operation continuously for a long period of time and economy would dictate a relatively low rate of continuous air consumption. A pressure range inside the porous capstan of 3½ to 4½ p.s.i. has been found satisfactory for the particle size range of 2 to 15 microns, but a somewhat higher pressure which may be as high as 10 p.s.i. or higher is preferred as heretofore indicated to provide a safety margin.

For an understanding of the invention it is important to note that the capstan wall made of sintered powdered metal is successful because it provides an exceedingly large number of closely spaced and uniformly distributed minute tortuous passages, each of which passages offers high frictional resistance to airflow. It is because the minute passages are so numerous and so close together that the airflow through the porous wall is substantially constant per unit area throughout the working surface of the reversing capstan, the result being an air cushion of uniform character with no tendency for the air cushion to shift the traveling tape laterally. It is also to be born in mind that in the operation of a fixed reversing capstan with a porous wall of the character described, there are two kinds of paths for airflow.

One kind of path is through the porous tubular wall and then through the air cushion to the atmosphere. The other kind of path is where the air that flows through the porous tubular wall is discharged directly into the atmosphere. Since the tape that passes around the periphery of a fixed reversing capstan of porous material follows only 180° of the circumference of the capstan all of the air passages of the remaining 180° discharge directly into the atmosphere.

It has been found advisable to make the axial dimension of the tubular porous wall somewhat larger than the width of the traveling tape to leave a margin of porous material adjacent both sides edges of the tape. Thus in FIG. 6 there are margins 48 of porous material along both sides of the traveling tape 16. It is apparent then that in FIG. 6 the larger portion of the air passages are directed into the atmosphere, the remaining portion, amounting to slightly less than half, being directed into the air blanket or cushion that spaces the traveling tape from the surface of the porous capstan.

Figure 8:
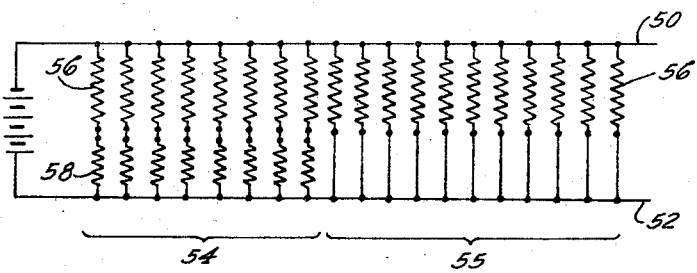
FIG. 8 is a diagram of an analogous electric circuit that represents the paths of air flow when the reversing capstan is in the form of a solid metal cylinder with numerous radial holes drilled therein.

FIG. 8 illustrates diagrammatically an electrical analogy in which electric current flows between two leads 50 and 52 of different potentials along a minor group 54 of conductor paths and along a major group 55 of conductor paths. Each of the paths of the minor group 54 consists of a very high ohmic resistor 56 and a small ohmic resistor 58 in series therewith. Each of the conductor paths of the major group 55 comprises solely one of the high ohmic resistors 56. Each high ohmic resistor 56 represents the resistance to air flow through a minute tortuous passage of the sintered metal wall of the reversing capstan. Each of the low ohmic resistors 58 represents the resistance afforded by the air cushion or air blanket.

Obviously, the pressure drop across each path comprising a resistor 56 in series with a resistor 58 in the minor group 54 is equal to the pressure drop across each single resistor 56 in the major group 55. Thus, referring to FIG. 10, if the interior of the capstan is maintained at a pressure of 3.5 p.s.i. and the particle size of the metal of the capstan is 5–10 microns, the rate of airflow per square inch of the area of the capstan surface that is exposed directly to the atmosphere will be 800 cubic inches per minute. If the pressure drop across the air cushion is 0.7 p.s.i. the available pressure drop through the air passages that feed that air blanket will be 2.8 p.s.i., and, as may be seen in FIG. 10, the airflow over the corresponding area of the porous capstan surface will be reduced to approximately 650 cubic inches per minute per square inch of area.

Figure 9:
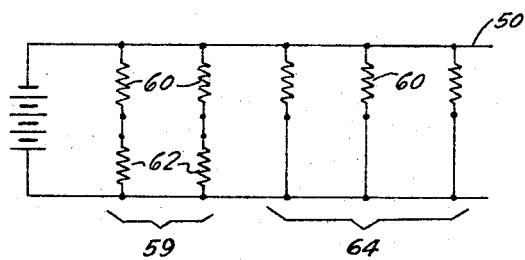
FIG. 9 is a similar analogous electric circuit representing the paths of air flow when the reversing capstan is in the form of a porous cylinder such as a cylinder made of sintered powdered metal.

In contrast, FIG. 9 employs the same electrical analogy to represent the air flow through a metal tube capstan having a distribution of relatively large and relatively widely spaced holes. In FIG. 9 each of a group 59 of electrical paths comprises a resistor 60 in series with a resistor 62, the resistor 60 representing the resistance to airflow through a bored hole in the metal wall and the resistor 62 representing the resistance to air flow offered by the air blanket. Each of the paths of the second group 64 comprises a single resistor 60 representing the resistance to airflow through a bored hole in the metal tube.

In this second analogy the presence or absence of a second resistor 62 along an electrical path makes a great deal of difference in the amount of current flow the path because the two resistances are both of relatively low ohmic value instead of the resistor 60 greatly exceeding the ohmic value of the resistor 62. Where a resistor 62 is absent from an electrical path, as in the group 64, the rate of current flow is greatly augmented.

From these two electrical analogies it may be appreciated that where a porous wall of material of small partical size is used for the purpose of the present invention it makes relatively little difference whether an air passage leads directly to the atmosphere or feeds the air cushion that spaces the traveling tape from the reversing surface of the capstan. It may also be appreciated that a single reversing capstan of ample axial dimension may be used with tapes of different widths, it being unnecessary to change from a reversing capstan of one axial dimension to a reversing capstan of another axial dimension when there is a change from tape of one width to tape of a different width. It may be further appreciated that with the exceedingly small air passages of the porous material spaced exceedingly close together, the air blanket is uniformly stable in contrast to the erratic behavior represented by FIG. 7.

In any particular application of the invention, it is contemplated that the loop of tape shown in FIG. 1 will be maintained under some predetermined tension, and of course, the air blanket created by the air flow through the porous material must balance this tension. Fortunately, however, the balancing of the opposed forces is not critical because a rise in tension on the part of the tape merely results in narrowing the spacing of the tape from the peripheral surface of the reversing capstan and the pressure per unit area of the air cushion or blanket automatically rises accordingly at a relatively high rate. Thus the thickness of the air blanket varies slightly to compensate for variation in the tension of the tape and care is taken to provide a blanket of sufficient thickness to afford an adequate safety margin.

Figure 5:
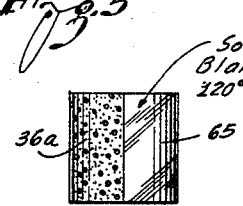
FIG. 5 is an elevational view of the porous cylindrical member of FIG. 4.

As stated above, the air paths for escape from the interior of the reversing capstan may be distributed uniformly around the whole circumference of the capstan. In the preferred practice of the invention, however, economy of air consumption is promoted by simply masking off the portion of the circumference of the stationary capstan that is not followed by the traveling tape. FIG. 5, for example, shows a cylindrical wall member 36a for a capstan structure with a layer of solder 65 covering the half of the circumference that is not followed by the tape.

My description in specific detail of the selected practice of the invention will suggest various changes, substitutions and other departures from my disclosure within the spirit and scope of the appended claims. For example, it is apparent that in its broader aspect the reversing capstan is a tape guide to change the direction of a traveling tape by 180°. Obviously the same basic structure may be used for various tape guides for various angles of change of direction.

I claim:

1. In a tape transport system wherein a travelling tape passes around a cylindrically curved means to form a loop with an ingoing leg and an outgoing leg with first means positively gripping the tape to feed the tape to the ingoing leg at a given rate and second means positively gripping the tape to withdraw the tape from the outgoing leg at a given higher rate to cooperate with the first means to maintain the loop under predetermined constant tension with transducer means cooperating with the tape adjacent at least one leg of the loop, wherein a closed-loop servo-mechanism regulates the speed of said first and second means to keep the speed of the tape in the loop constant within a small range of deviation and wherein said transducer means includes a reading head that is included in the closed-loop servomechanism, the improvement to enable the system to drive the tape in a stable manner with the range of deviation reduced to a few microinches, comprising:

said cylindrically curved means being a stationary hollow member having a curved wall at its exterior to guide the tape, the curved wall being porous and being formed from solid particles to provide numerous closely spaced exceedingly small tortuous flow passages therethrough;

means for providing compressed gaseous fluid; and means operatively coupled to the last mentioned means to supply the interior of the hollow member with the compressed gaseous fluid for flow through the tortuous flow passages to the curved wall to maintain a cushion of the gaseous fluid between the traveling tape and the curved wall and to maintain the tape out of contact with the curved wall in opposition to the tension of the tape.

2. A combination as set forth in claim 1 in which the curved wall is made of fine, solid particles bonded together at spaced peripheral points to form interstices providing numerous minute flow passages through the curved wall.

3. A combination as set forth in claim 1 in which the size of the solid particles is in the range of 2–50 microns.

4. A combination as set forth in claim 1 in which the curved wall is made of sintered metal powder.

5. In a tape transport system wherein a travelling tape passes around a cylindrically curved means to form a loop with an ingoing leg and an outgoing leg with first means positively gripping the tape to feed the tape to the ingoing leg at a given rate and second means positively gripping the tape to withdraw the tape from the outgoing leg at a given higher rate to cooperate with the first means to maintain the loop under predetermined constant tension with transducer means cooperating with the tape adjacent at least one leg of the loop, wherein a closed-loop servomechanism regulates the speed of said first and second means to keep the speed of the tape in the loop constant within a small range of deviation and wherein said transducer means includes a reading head that is included in the closed-loop servomechanism, the improvement to enable the system to drive the tape in a stable manner with the range of deviation reduced to a few microinches, comprising:

said cylindrically curved means being a hollow stationary tube having a wall made of sintered metal powder with interstices between the powder particles forming closely spaced minute tortuous flow passages through the wall of the tube;

means for providing pressurized gaseous fluid; and means operatively coupled to the last mentioned means and forming a supply passage into the hollow interior of the tube to maintain the pressurized gaseous fluid inside the tube, the interior of the tube being closed from the atmosphere except for the minute flow passages to confine the discharge of the gaseous fluid to the flow passages and to interpose a cushion of the gaseous fluid between the tape and the surface of the tube for maintaining the tape spaced from the tube in opposition to the tension in the tape.

6. In a tape transport system wherein a travelling tape passes around a cylindrically curved means to form a loop with an ingoing leg and an outgoing leg with first means positively gripping the tape to feed the tape to the ingoing leg at a given rate and second means positively gripping the tape to withdraw the tape from the outgoing leg at a given higher rate to cooperate with the first means to maintain the loop under predetermined constant tension with transducer means cooperating with the tape adjacent at least one leg of the loop, wherein a closed-loop servomechanism regulates the speed of said first and second means to keep the speed of the tape in the loop constant within a small range of deviation and wherein said transducer means includes a reading head that is included in the closed-loop servomechanism, the improvement to enable the system to drive the tape in a stable manner with the range of deviation reduced to a few microinches, comprising:

said cylindrically curved means being a stationary porous tubular member having a circumferential wall and a first circumferential portion in the wall to conform with the change in direction of the traveling tape and having in the wall a second circumferential portion displaced from the first circumferential portion;

means for providing a gaseous fluid under pressure;

means operatively coupled to the last mentioned means to maintain the gaseous fluid under pressure in the tubular member for flow through the circumferential wall of the tubular member to maintain a layer of gaseous fluid between the tape and the circumferential wall of the tubular member; and means masking the second circumferential portion of the tubular member to prevent flow of the gaseous fluid therethrough.

7. In a tape transport system wherein a travelling tape passes around a cylindrically curved means to form a loop with an ingoing leg and an outgoing leg with first means positively gripping the tape to feed the tape to the ingoing leg at a given rate and second means positively gripping the tape to withdraw the tape from the outgoing leg at a given higher rate to cooperate with the first means to maintain the loop under predetermined constant tension with transducer means cooperating with the tape adjacent at least one leg of the loop, wherein a closed-loop servomechanism regulates the speed of said first and second means to keep the speed of the tape in the loop constant within a small range of deviation and wherein said transducer means includes a reading head that is included in the closed-loop servomechanism, the improvement to enable the system to drive the tape in a stable manner with the range of deviation reduced to a few microinches, comprising:

said cylindrically curved means being a stationary closed porous tube having a porous wall of bonded particles of less than 60 microns in size to guide the traveling tape through the change in direction;

means for providing gaseous fluid under pressure; and means operatively coupled to the last mentioned means to maintain the gaseous fluid under pressure inside the tube to cause flow through the porous wall of the tube for maintaining a cushion of the gaseous fluid between the traveling tape and the tube and for maintaining the tape out of contact with the well of the tube.

8. In a tape transport system wherein a travelling tape passes around a cylindrically curved means to form a loop with an ingoing leg and an outgoing leg with first means positively gripping the tape to feed the tape to the ingoing leg at a given rate and second means positively gripping the tape to withdraw the tape from the outgoing leg at a given higher rate to cooperate with the first means to maintain the loop under predetermined constant tension with transducer means cooperating with the tape adjacent at least one leg of the loop, wherein a closed-loop servomechanism regulates the speed of said first and second means to keep the speed of the tape in the loop constant within a small range of deviation and wherein said transducer means includes a reading head that is included in the closed-loop servomechanism, the improvement to enable the system to drive the tape in a stable manner with the range of deviation reduced to a few microinches, comprising:

said cylindrically curved means being a stationary closed tube having a wall made of a sintered stainless steel powder of a particle size within the range of 2–25 microns;

means for providing gaseous fluid under pressure; and means operatively coupled to the last mentioned means to maintain the gaseous fluid inside the tube at a pressure in the range of 2–10 p.s.i. to cause the gaseous fluid to flow through the wall of the tube and to form a cushion of gaseous fluid between the traveling tape and the tube to keep the tape out of contact with the tube.

9. In a tape transport system for use with a movable tape, the combination of:

a tape guide with a curved peripheral wall for engaging the tape and reversing the direction of the tape to form a tape loop having outgoing and ingoing legs with the outgoing leg of the loop traveling to the tape guide and the ingoing leg of the loop traveling from the tape guide, the tape guide being provided with a porous wall to provide for a passage of fluid through the wall;

rotary drive means;

means cooperative with the rotary drive means to grip the tape in a positive manner to drive the outgoing leg of the tape loop at a given rate and to drive the ingoing leg at a lesser rate, to maintain the tape loop under predetermined constant tension;

means adjacent the tensioned loop to sense the rate of travel of the tape;

means to actuate the rotary drive means;

a servomechanism including said sensing means and said actuating means to regulate the velocity of the tape;

means for providing fluid under pressure; and means operatively coupled to the last mentioned means to maintain a layer of the gaseous fluid between the traveling tape and the tape guide under sufficient pressure to withstand the tension of the tape and to isolate the tape from the tape guide for stabilization of the tensioned tape loop and to make the tape loop throughout its length substantially simultaneously and instantaneously responsive to the servomechanism.

10. A combination as set forth in claim 9 in which said sensing means is closer to said means for reversing the direction of the tape than to said rotary drive means.

11. A combination as set forth in claim 9 in which said sensing means is one of a plurality of transducers positioned along one of the legs of the tape loop, said sensing means being closer to said means for reversing the direction of the tape than any other sensing means of said plurality.

12. In combination for forming a tape into a driven tensioned loop with the loop uniformly responsive throughout its length to the driving force:

a drive capstan;

a hollow reversing guide means having a porous circumferential wall cooperative with the drive capstan to form the tape into a loop with an outgoing leg of the loop traveling from the drive capstan to the reversing guide means and an ingoing leg of the loop traveling from the reversing guide means to the drive capstan;

first rotary means pressing the tape against the capstan to grip the tape in a positive manner to drive the outgoing leg of the tape at a given rate;

second rotary means pressing the tape against the capstan to grip the tape in a positive manner to drive the ingoing leg of the tape loop at a lesser rate to cooperate with the first rotary means to maintain the tape loop under predetermined constant tension;

means for providing gaseous fluid under pressure; and means operatively coupled to the last mentioned means to maintain the gaseous fluid under pressure inside the hollow reversing guide means for outward flow through the porous circumferential wall thereof to maintain a layer of gaseous fluid under pressure between the traveling tape and the reversing guide means in opposition to the tension of the tape and to isolate the tape from the reversing guide means for stabilization of the tensioned tape loop.

13. The combination set forth in claim 12 wherein the hollow reversing guide means is stationary.

References Cited by the Examiner

UNITED STATES PATENTS

| | | | |
|---|---|---|---|
| 2,855,249 | 10/1958 | Gerard. | |
| 2,968,702 | 1/1961 | Fay | 226—95 X |
| 3,032,246 | 5/1962 | Fritze | 226—97 |
| 3,078,022 | 2/1963 | Durbeck | 226—97 |
| 3,125,265 | 3/1964 | Warren | 226—95 X |
| 3,143,267 | 8/1964 | Maxey | 226—95 |
| 3,156,399 | 11/1964 | Wadey | 226—97 |

M. HENSON WOOD, Jr., *Primary Examiner.*

ROBERT B. REVES, *Examiner.*

R. A. SCHACHER, *Assistant Examiner.*